(12) United States Patent
Si et al.

(10) Patent No.: US 9,817,766 B1
(45) Date of Patent: Nov. 14, 2017

(54) MANAGING RELOCATION OF SLICES IN STORAGE SYSTEMS

(71) Applicant: EMC Corporation, Hopkinton, MA (US)

(72) Inventors: Yining Si, Shrewsbury, MA (US); Xiangping Chen, Sherborn, MA (US); Ye Zhang, Shanghai (CN); Qin Tao, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 270 days.

(21) Appl. No.: 13/730,586

(22) Filed: Dec. 28, 2012

(51) Int. Cl.
*G06F 3/06* (2006.01)
*G06F 12/08* (2016.01)
*G06F 12/0866* (2016.01)
*G06F 12/02* (2006.01)

(52) U.S. Cl.
CPC ........ *G06F 12/0866* (2013.01); *G06F 3/0647* (2013.01); *G06F 12/02* (2013.01)

(58) Field of Classification Search
USPC .................. 711/117, 165, E12.016, E12.083
See application file for complete search history.

(56) References Cited

U.S. PATENT DOCUMENTS

| | | | |
|---|---|---|---|
| 7,640,408 B1* | 12/2009 | Halligan et al. | 711/162 |
| 7,945,733 B2* | 5/2011 | Jagadish et al. | 711/114 |
| 8,650,373 B2* | 2/2014 | Hatsuda et al. | 711/162 |
| 2007/0208790 A1* | 9/2007 | Reuter et al. | 707/206 |
| 2010/0169553 A1* | 7/2010 | Yano et al. | 711/103 |
| 2011/0179250 A1* | 7/2011 | Matsuzawa et al. | 711/209 |
| 2012/0023300 A1* | 1/2012 | Tremaine et al. | 711/162 |
| 2012/0042124 A1* | 2/2012 | Miyamoto et al. | 711/114 |
| 2012/0137098 A1* | 5/2012 | Wang et al. | 711/165 |
| 2012/0233434 A1* | 9/2012 | Starks et al. | 711/170 |
| 2012/0260040 A1* | 10/2012 | Mallge et al. | 711/117 |
| 2013/0275694 A1* | 10/2013 | Gao et al. | 711/162 |

* cited by examiner

*Primary Examiner* — Hal Schnee
(74) *Attorney, Agent, or Firm* — Krishnendu Gupta; Deepika Bhayana

(57) ABSTRACT

A method is used in managing data relocation in storage systems. Metadata of a slice of a storage tier in a data storage system is evaluated for migrating the slice from the storage tier to another storage tier. The data storage system includes a first storage tier and a second storage tier configured such that performance characteristics associated with the first storage tier is superior to the second storage tier. Based on the evaluation, relocation of the slice of the storage tier is effected. The metadata of the slice indicates whether the slice includes user data.

14 Claims, 12 Drawing Sheets

MANAGING RELOCATION OF SLICES IN STORAGE SYSTEMS

BACKGROUND

Technical Field

This application relates to managing data relocation in storage systems.

Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

SUMMARY OF THE INVENTION

A method is used in managing data relocation in storage systems. Metadata of a slice of a storage tier in a data storage system is evaluated for migrating the slice from the storage tier to another storage tier. The data storage system includes a first storage tier and a second storage tier configured such that performance characteristics associated with the first storage tier is superior to the second storage tier. Based on the evaluation, relocation of the slice of the storage tier is effected. The metadata of the slice indicates whether the slice includes user data.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
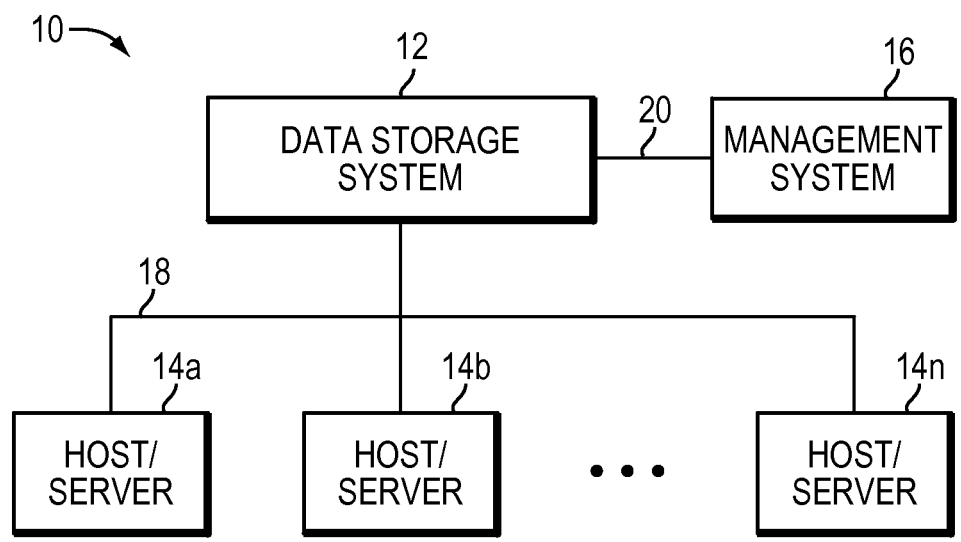
FIGS. 1-2 are examples of an embodiment of a computer system that may utilize the techniques described herein.

Described below is a technique for use in managing data relocation in storage systems, which technique may be used to provide, among other things, evaluating metadata of a slice of a storage tier in a data storage system for migrating the slice from the storage tier to another storage tier, where the data storage system includes a first storage tier and a second storage tier configured such that performance characteristics associated with the first storage tier is superior to the second storage tier, and based on the evaluation, effecting relocation of the slice of the storage tier, where the metadata of the slice indicates whether the slice includes user data.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A pool may include a set of storage tiers. A storage tier may include storage devices of similar or same performance capabilities and cost. However, a pool may have storage devices of different performance capabilities and costs. Both pool and storage tier contain slices. A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

Slice relocation (herein also referred to as a "data relocation" or "data migration") is a process of determining optimal or near optimal data placement among storage objects (e.g., storage tier, RAID group) based on I/O load of the storage objects. Slice relocation helps provide a way to determine respective preferable or best storage locations of slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os.

Further, a tiered storage pool may include storage with different performance characteristics such that a logical unit created from storage space provisioned from the storage pool may include slices from different storage tiers with different performance characteristics. Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice. Further, a slice that is provisioned to a logical unit but not yet written to by a host system with user data is referred to as an empty slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

Thus, when a DLU is completely provisioned at the time the DLU is created; either all or most of the slices of the DLU may be empty at the time the DLU is created. Further, when a slice is provisioned to TLU dynamically upon a request to write data to the TLU, the TLU may include few empty slices.

An automated storage tiering process (also referred to herein simply as "slice relocation process") relocates slices among storage tiers in order to improve I/O performance, decrease system runtime cost and reduce disk drive wear. However, the process of slice relocation consumes system resources such as CPU, memory, cache space, and bandwidth of a backend storage device. Thus, it may be desirable to relocate slices of a storage system efficiently with least or reduced impact on I/O performance of the storage system.

In a conventional system, an automated storage tiering process relocates slices without evaluating whether a slice that is being relocated is an empty slice or includes user data. As a result, in such a conventional system, when an empty slice is relocated from a hot storage tier to a cold storage tier in order to accommodate new active slices (also referred to herein as "hot" slices) in the hot storage tier, entire contents of the empty slice is copied to a destination slice in the cold storage tier even though data represented by the contents of the empty slice is invalid. Further, generally, an empty slice may either be relocated by the automated storage tiering process dynamically to create additional storage space in a storage tier or when a user changes a tiering preference of a logical unit including the empty slice. Thus, in such a conventional system, copying contents of an empty slice when relocating the empty slice consumes processing cycles of a CPU of a storage system and bandwidth of backend storage disks, increases the overall amount of time required to relocate slices, and increases wear and tear of disk drives of a storage system. Further, in such a conventional system, data of a slice is relocated even when the slice does not include any user data. Further, in such a conventional system, empty slices that are provisioned to logical units but not yet written may be considered as cold slices because the empty slices are not being used by a host to write user data thereby becoming susceptible to relocation to cold storage tiers. Thus, in such a conventional system, empty provisioned slices that are cold based on temperature may be relocated to a cold storage tier during load balancing process. Further, in such a conventional system, empty provisioned slices that are cold based on temperature may be relocated when a user changes tiering preference of a logical unit including the empty provisioned slices. Consequently, in such a conventional system, copying of entire contents of empty provisioned slices that are cold results in copying of a large amount of either invalid data or data including zeros (e.g. gigabytes of data) thereby resulting in consumption of a large amount of storage system resources.

By contrast, in at least some implementations in accordance with the technique as described herein, the current technique evaluates whether a slice is an empty slice and avoids copying contents of the empty slice during a slice relocation process. Thus, in at least one embodiment of the current technique, overall storage system performance is increased by identifying empty slices during relocation of slices and avoiding copying of data when relocating an empty slice. Thus, in case of a DLU where entire storage space for the DLU is provisioned using slices from a storage pool at the time DLU is created, either all or most of the slices are empty slices. Thus, in such a case, using the current technique, avoiding copying data of empty slices of a DLU significantly improves performance of a slice relocation process and reduces overall impact of the slice relocation process on a storage system.

In at least one embodiment of the current technique, metadata such as a bit (also referred to herein as "empty slice bit") is added to a slice map entry metadata associated with a slice indicating whether valid user data has been written to the slice. When a slice is provisioned to a logical unit, the empty slice bit for the slice is set to zero indicating that the slice is an empty slice. Further, when data is first written to a slice, the empty slice bit for the slice is set to one indicating that the slice includes valid user data. Further, in at least one embodiment of the current technique, the empty slice bit for a slice may be maintained in a memory of a storage system in order to efficiently evaluate metadata information for the slice without having to read the metadata information from a disk. During relocation of a slice, a determination is made as to whether the empty slice bit for the slice is set indicating that the slice is an empty slice. Upon determining that a slice is an empty slice, copying of contents of the slice is skipped and metadata of a destination slice is updated to indicate that the slice has been relocated without having to copy the contents of the slice.

In at least some implementations in accordance with the current technique as described herein, the use of the managing data relocation in storage systems technique can provide one or more of the following advantages: lowering storage costs by improving efficiency of the data storage system, and improving I/O performance of a storage system by efficiently relocating slices and avoiding copying of invalid and/or zero data of empty slices.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

An Auto-Tiering policy engine (PE) of the data storage system 12 examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
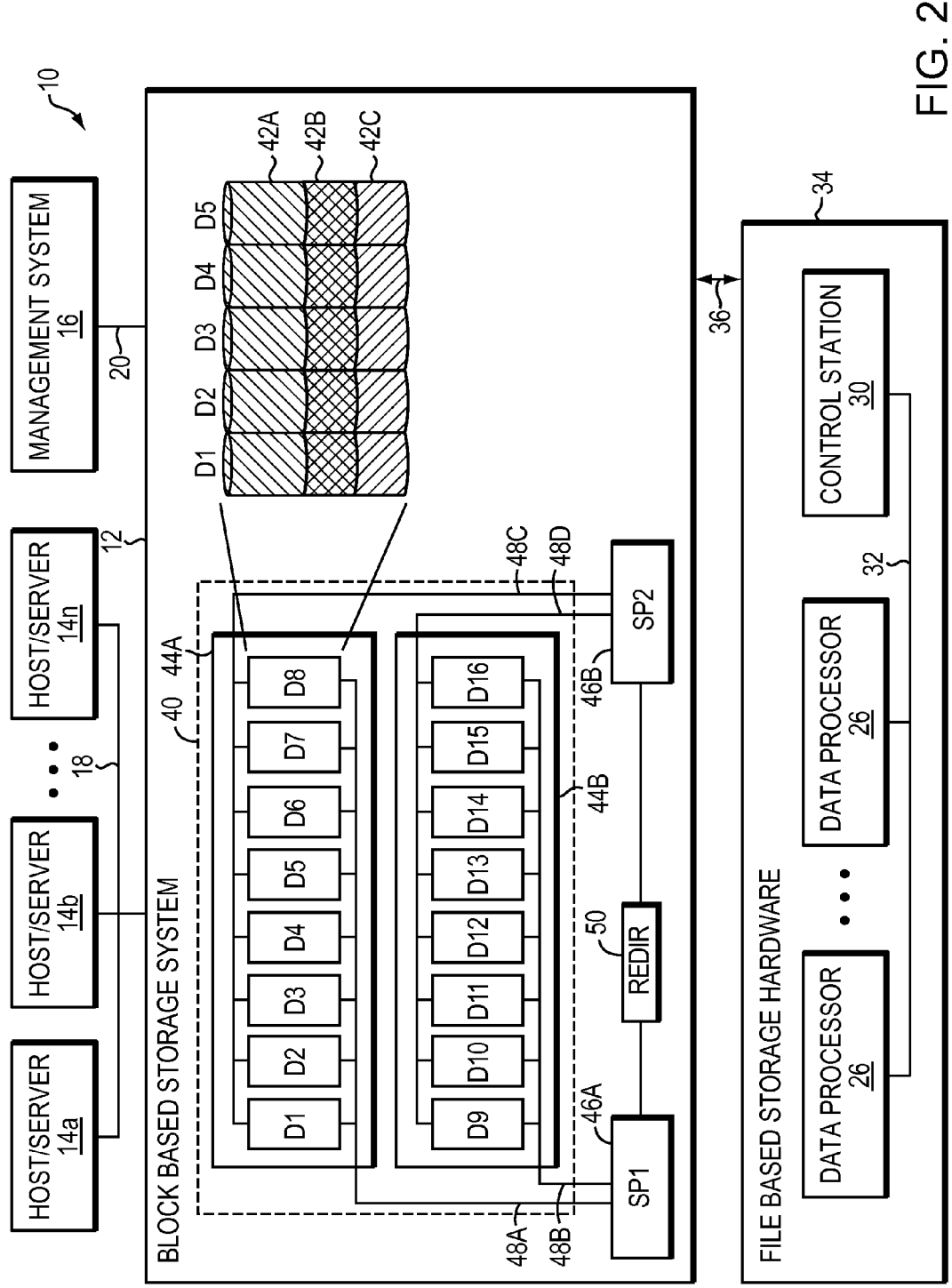

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 1, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
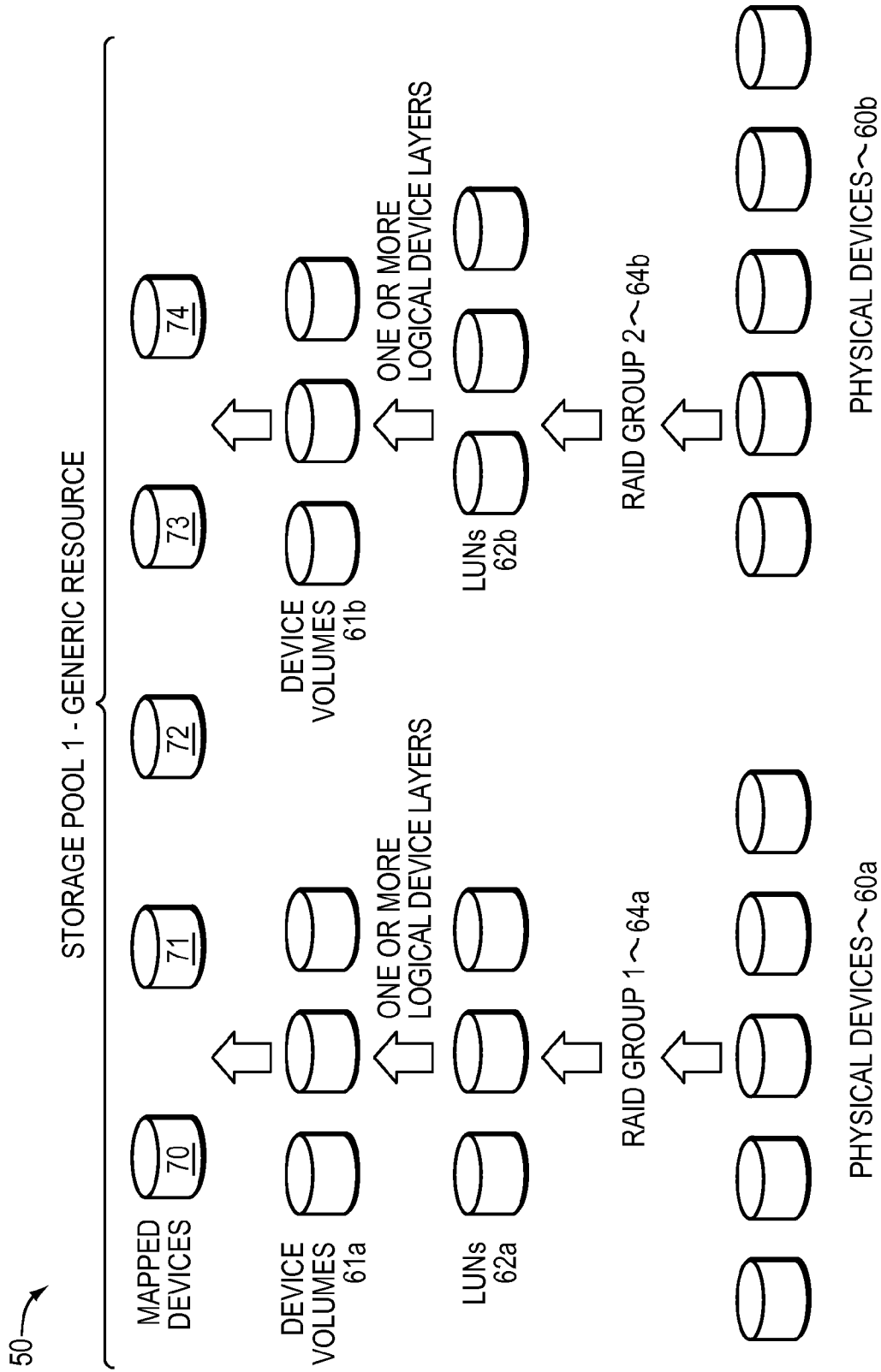
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, on physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4A:
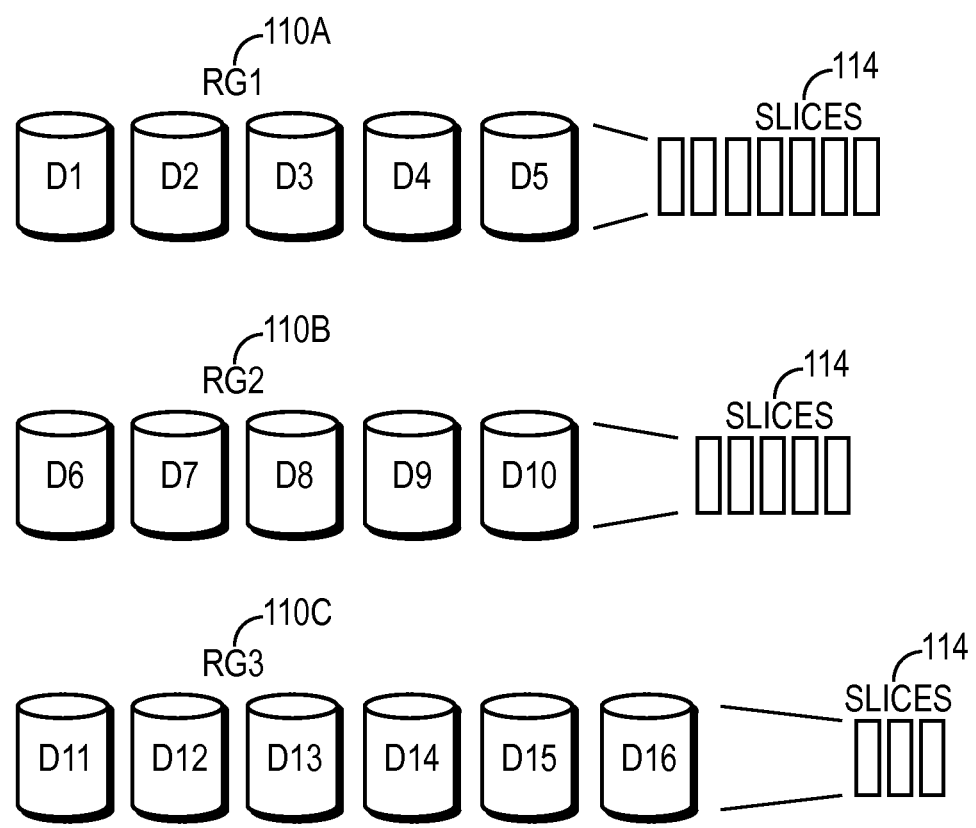
FIGS. 4A and 4B are examples illustrating storage device layout.

Referring to FIG. 4A, shown is a diagram illustrating an exemplary logical division of a storage of a data storage system into storage objects (such as RAID groups) for managing data relocation in the data storage system that may be included in an embodiment using the techniques described herein. With reference also to FIGS. 1 and 2, for example, storage entities 102 may refer to either a single storage device or a RAID group operating as a single storage device, may be further sub-divided into logical units. A single RAID group or individual storage device may contain one or more logical units (LUs) 42. However, RAID groups need not correspond to LUs and RAID groupings may be further divided into two or more LUs. In addition to RAID groups, each logical unit 42 may be further subdivided into portions of a logical unit, referred to as "slices" 114. Slices 114 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 46A, 46B. The slice manager may be responsible for implementing a slice allocation policy and/or algorithm. For example, the slice manager may receive slice allocation requests, and maintain relevant statistical information regarding slices.

Figure 4B:
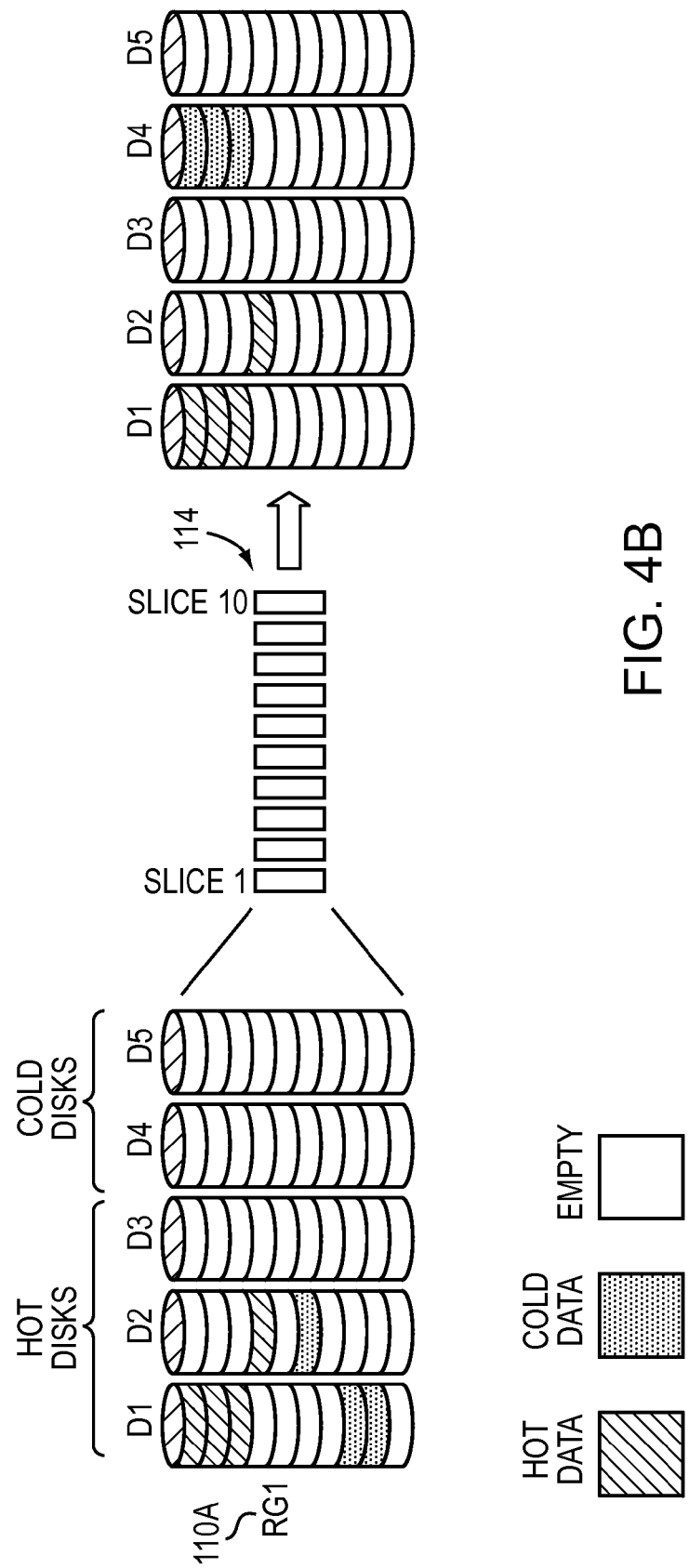

Referring to FIG. 4B, shown is a diagram illustrating another example of logical division of a storage of a data storage system into storage objects (such as RAID groups, storage devices, slices) for managing data relocation in the data storage system that may be included in an embodiment using the techniques described herein. In at least one embodiment, a collection of hard disk drives may be organized into RAID arrays. The collective data storage capacity of storage devices (e.g., RG1 110A) is represented by data storage space. The data storage space may be divided into portions, hereinafter referred to as slices 114 (e.g., SLICE1-SLICE10). In at least one embodiment of the current technique, for example, each slice 114 is approximately 1 gigabyte (GB) in size, but other sizes may be used. Slices 114 within the data storage space may be organized into logical units (LUs), which are commonly referred to as LUNs.

In at least one embodiment of the current technique, data storage systems that comprise storage devices of varied performance characteristics grouped into tiers can be managed in such a way as to migrate data from one portion of the storage pool to another portion of the storage pool. A particular embodiment may help achieve this migration by automatically migrating data among the tiers based on the "temperature" of contents of a slice and location of the slice on storage devices. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Hence, warm data may refer to data that is accessed more often than cold data and less often that hot data. In general, hot data is migrated to faster (and typically more expensive) storage, and cold data is migrated to slower (and typically less expensive) storage. Warm data may be migrated to either type of storage and such storage may be configurable to be placed in a reduced power consumption state. Generally, migration maybe accomplished by copying the data and changing the map entries for the logical addressed that were involved to reflect the new logical to physical association. Thus, hot data may be stored in disk drives indicated as hot disks and cold data may be stored in disk drives indicated as cold disks.

Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 5:
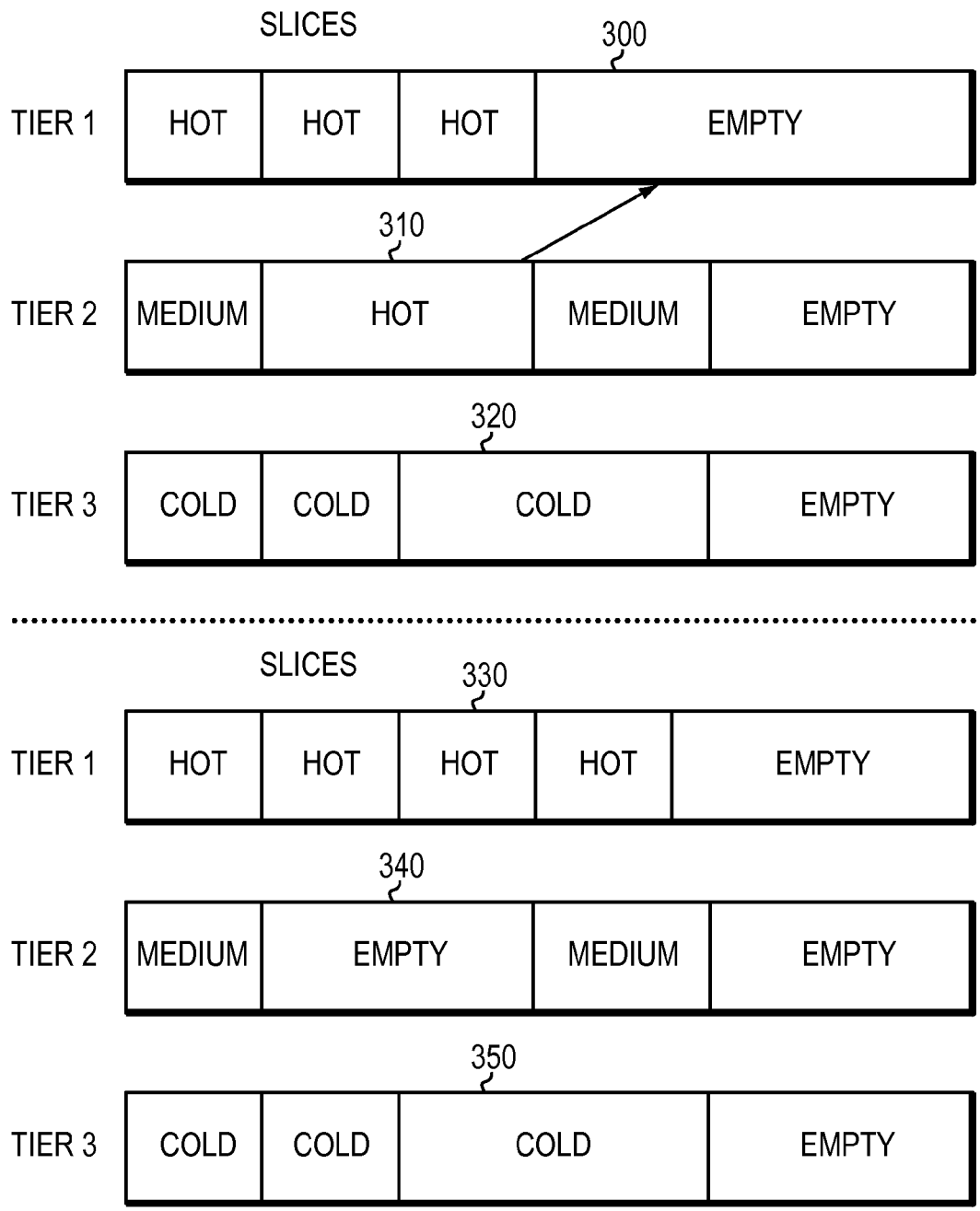
FIGS. 5-10 are block diagrams illustrating in more detail components that may be used in connection with techniques herein.

Referring now to FIG. 5 that illustrates a process of relocating slices from a first storage tier of a storage pool to a second storage tier of the storage pool in a data storage system. In this figure, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 5, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 5 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 5, it is shown that there is a hot slice 310 in Tier 2 that should be moved to Tier 1. In this example embodiment, as shown in the lower portion of FIG. 5, the hot slice is moved to Tier 1 leaving an empty space 340 in Tier 2.

Figure 6:
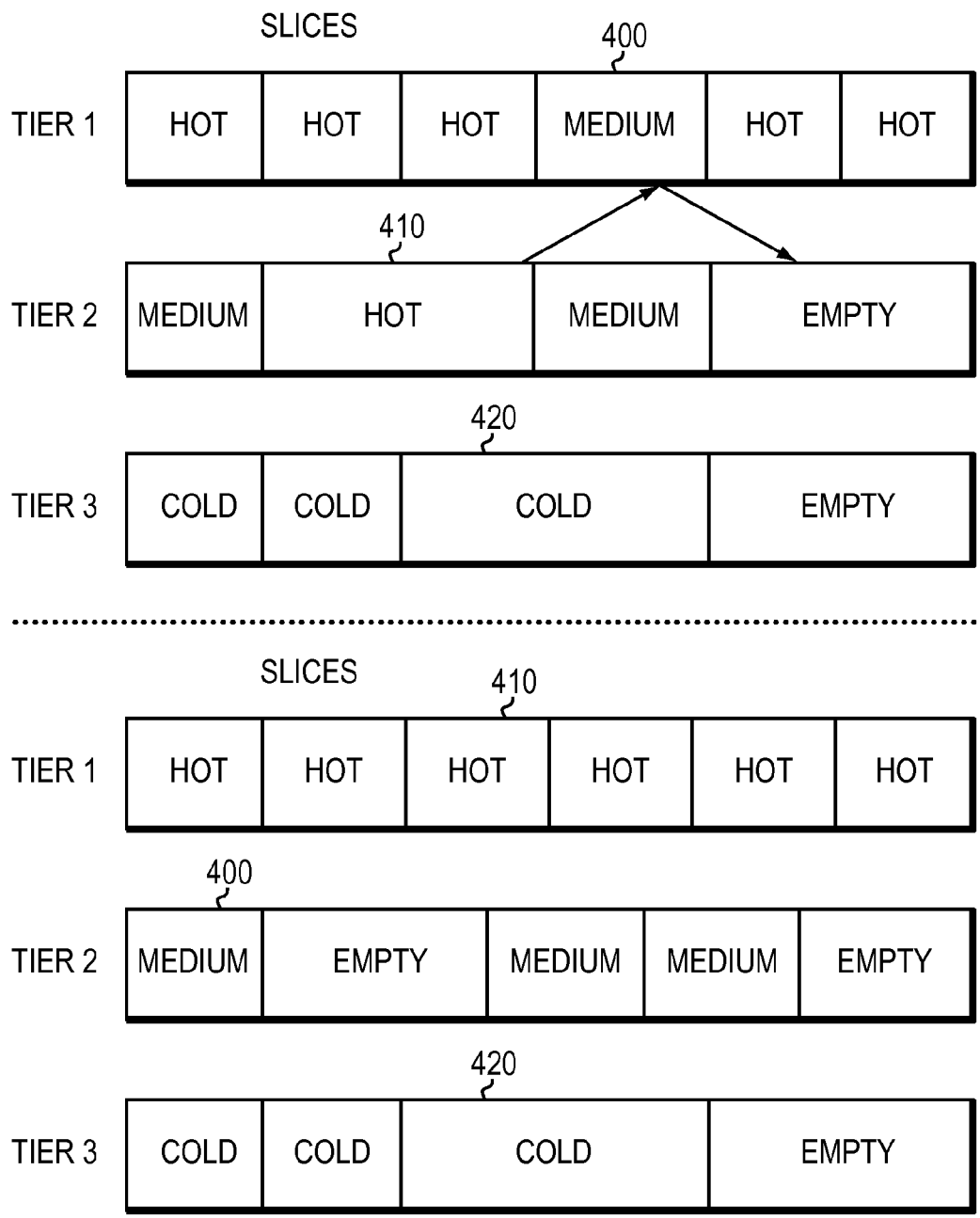

Referring now to FIG. 6 that illustrates a process of relocating slices from a first storage tier of a storage pool to a second storage tier of the storage pool in a data storage system. In this embodiment, there is a hot slice 410 in Tier 2 and a medium slice 400 in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access requests. Therefore, a slice's temperature may rise or fall over time. The slice's temperature may be the result of any number of calculations based on data access or data write requests to that slice.

Figure 7:
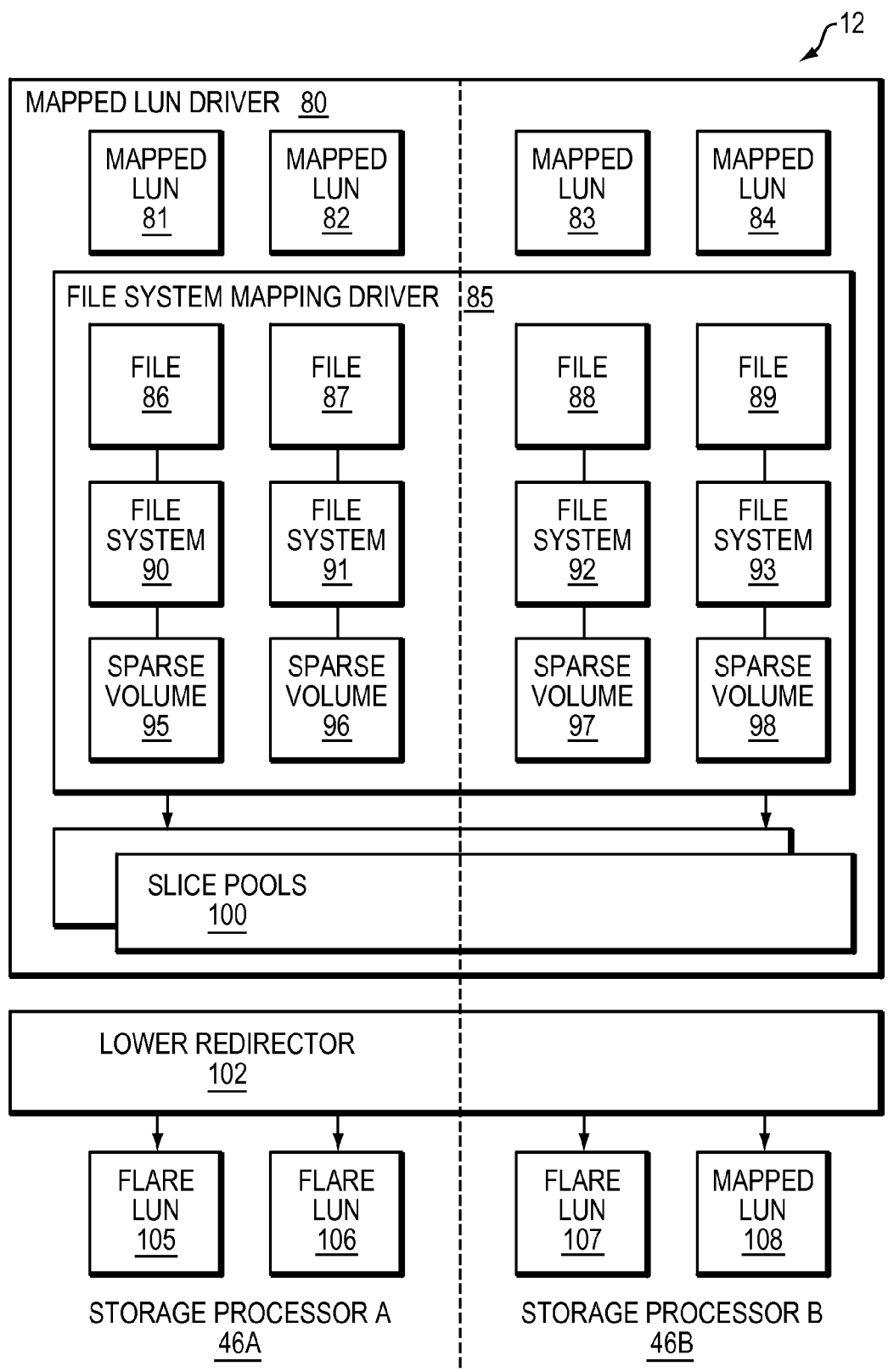

Referring to FIG. 7, shown is more detailed example of an embodiment of a computer system that may be used in connection with performing the techniques described herein. With reference also to FIGS. 1-3, in a data storage system such as data storage system 12, a storage processor provides communications between host 14 and disk drives 60. Data storage system 12 includes at least two storage processors 46A, 46B. Both storage processor A (SPA) 46A and storage processor B (SPB) 46A provides access to Flare LUNs 105-108 built from a storage space provided by disk drives 60. Generally, a Flare LUN can only be accessed by one storage processor. Lower redirector 102 interacts with storage processors 46A, 46B to access Flare LUNs 105-108. The access to Flare LUNs 105-108 is independent of which storage processor each Flare LUN belongs to. A user of data storage system 12 allocates storage from Flare LUNs in fixed sized chunks. Each fixed size chunk is known as a slice. One or more slices are grouped together to create a slice pool. Host system 14 provisions storage from slice pools 100 for creating mapped LUNs 81-84. A mapped LUN is a LUN that is visible to host system 14 and a user of a data storage system. A mapped LUN may be a thin LUN (TLU) or a direct LUN (DLU). The size of a thin LUN is independent of amount of available storage. Typically, storage is allocated to a thin LUN when host system 14 issues a write request and needs a data block to write user's data. The size of a direct LUN is dependent of amount of available storage. Typically, storage is allocated to a direct LUN at the time the direct LUN is created and initialized. File system mapping driver 85 is a light-weight file system library that provides file system functionality and allows data storage system 12 to create files within a file system. File system mapping driver 85 processes I/Os directed to metadata of a file system. Mapped LUN driver 80 processes I/Os directed to data of the file system. Mapped LUN driver 80 also provides slices of storage from slice pools 100 to file system mapping driver 85 for creating a file system. Slices of storage can be dynamically added or removed by a file system. When a slice is removed, the file system redistributes data stored on the slice to other slices in the file system. File system mapping driver 85 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 85 into a logical contiguous address space on which a file system is created. The sparse volume maintains logical to physical mapping for slices of storage used to create the file system. Further, the file system maintains an allocation bitmap for every slice of physical storage that is used to create the file system. A mapped LUN presents a file as a LUN to host system 11. Further, the file presents a contiguous logical address space to the mapped LUN. For example, in FIG. 7, mapped LUN 81 presents file 86 as a LUN to host system 11, file 86 is created in a file system 90 and file system 90 is created from sparse volume 95. Similarly, mapped LUNs 82-84 presents file 87-89 as LUNs respectively to host system 11, files 87-89 are created in file systems 91-93 respectively and file systems 91-93 are created from sparse volumes 96-98 respectively. Further, sparse volumes 95-98 are created from slices of physical storage included in slice pools 100.

Figure 8:
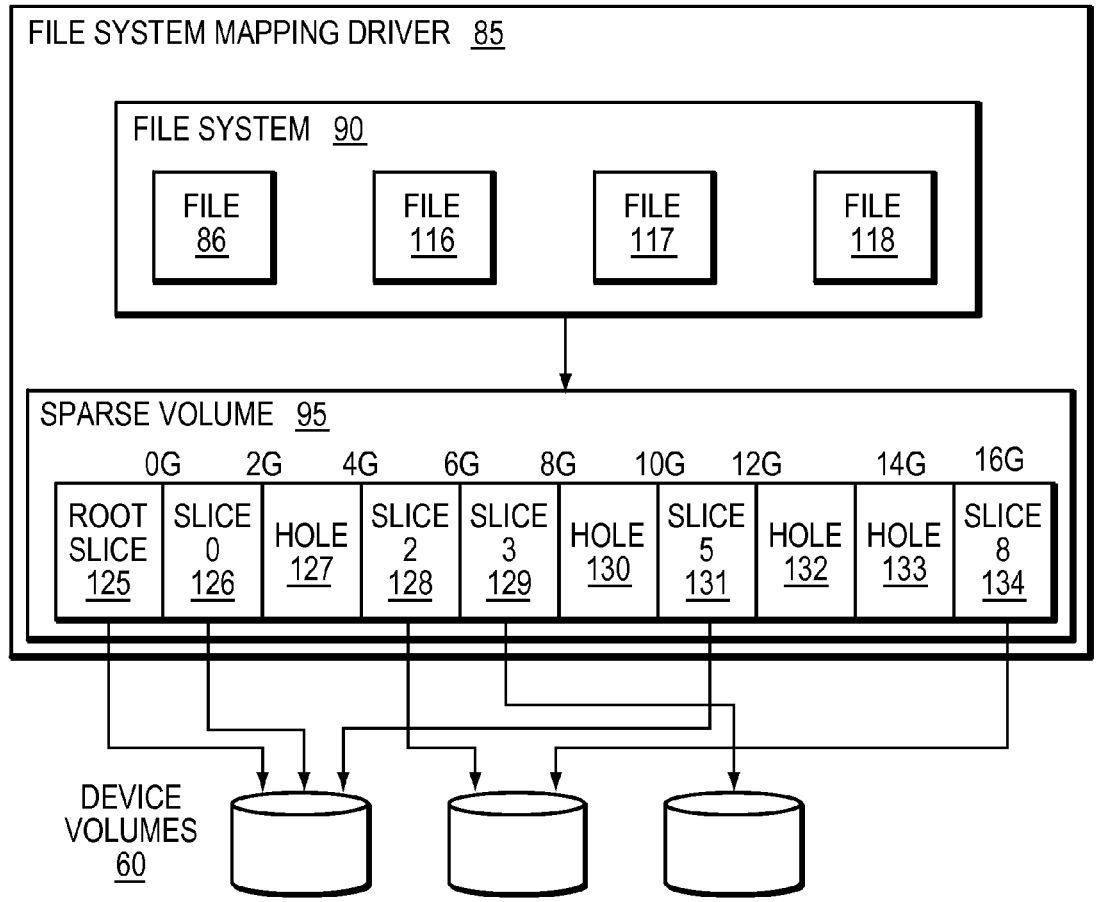

Referring to FIG. 8, shown is more detailed representation of a file system mapping driver 85 that may be included in an embodiment using the techniques herein. Sparse volume 95 aggregates one or more slices of physical storage together into a contiguous logical address space while some of these slices may or may not be provisioned. A provisioned slice has physical storage space allocated for storing data in the provisioned slice. For example, in FIG. 8, sparse volume 95 aggregates slices 125-134 together into a logical address space of 16 gigabyte (GB), where each slice is 1 gigabyte (GB) in size. However, it should be noted that each slice may be 256 megabyte (MB) in size. Root slice 125 and Slice-0 126 in a sparse volume is always provisioned, such that a storage space is available to store metadata information for slices included in the sparse volume 95. File system 90 is created from the contiguous logical address space provided by the sparse volume 95. A user of data storage system 12 creates files 86, 116-118 in file system 90. Each provisioned slice of a sparse volume has a corresponding configured slice object that is mapped to a corresponding LUN of physical storage included in device volumes 60. In at least some implementations, root slice 125 is stored in a data portion of slice-0 126, but for generality, the root slice is defined independently of the slice-0. Additionally, root slice 125 holds logical to physical address mapping for sparse volume 95.

At any given time, a storage space for a file system is either allocated (also referred to as provisioned) or not. If a storage space for a file system is not allocated, then there is said to be a hole at that location in a logical extent of the file system. For example, in FIG. 8, logical address space of sparse volume 95 has four holes 127, 130, 132, 133 indicating that slices corresponding to those locations are not provisioned.

Figure 9:
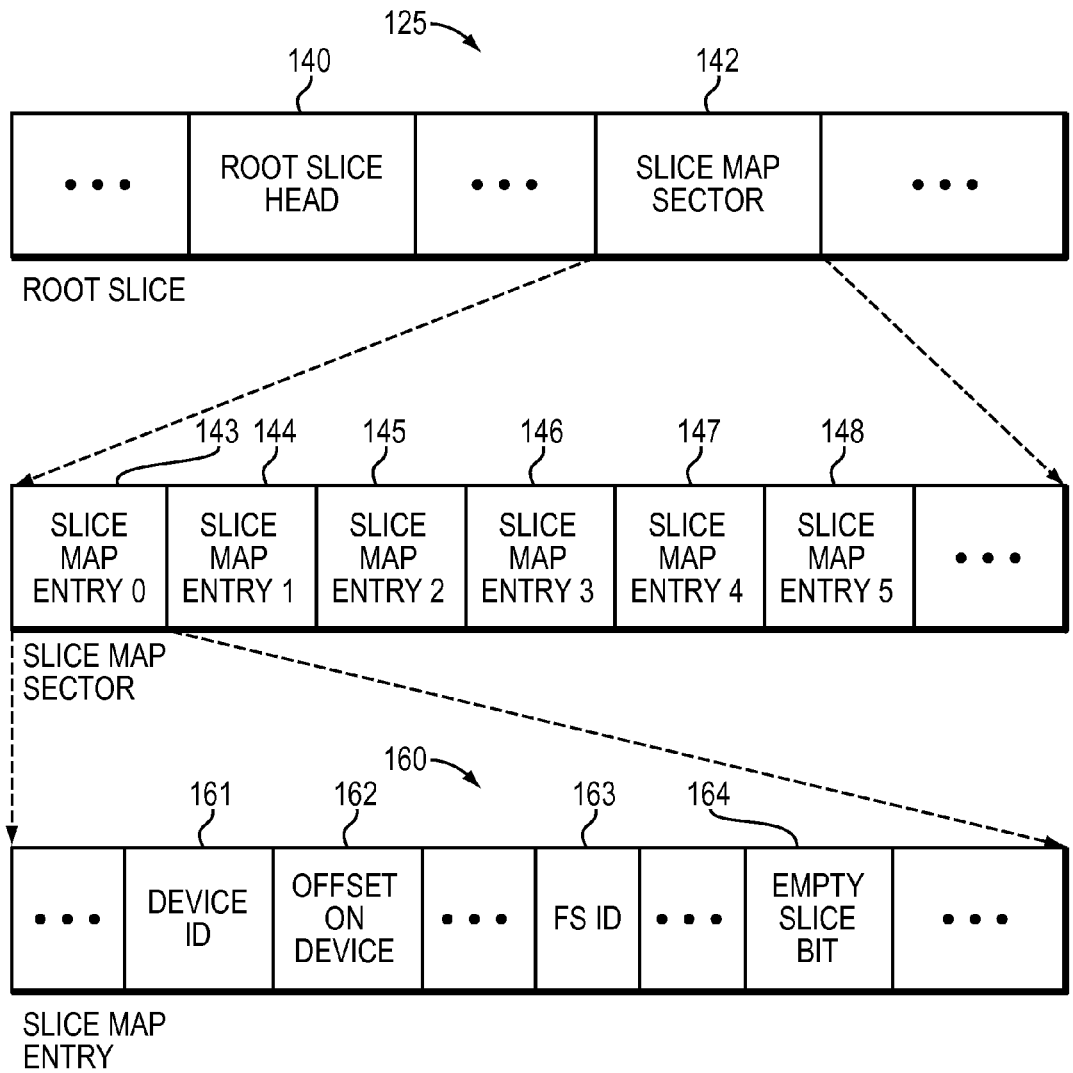

Referring to FIG. 9, shown is a more detailed representation of components that may be included in an embodiment using the techniques described herein. With reference also to FIG. 8, root slice 125 of a sparse volume 95 includes metadata of the sparse volume 95. Root slice 125 includes metadata information such as root slice head 140 pointing to the first slice of a set of slices included in the sparse volume 95, and slice map sector 142 which includes metadata entries such as a slice map entry 160 for each slice of the set of slices included in the sparse volume 95. For example, as shown in FIG. 9, slice map sector 142 includes slice map entries for slices 143-148 (other slices not shown) included in the sparse volume 95. A slice map entry such as slice map entry-0 143 for a slice includes metadata information for the slice. The metadata information included in the slice map entry 143 for a slice includes device identification number 161 indicating a physical device on which the slice resides, offset 162 indicating the offset at which the slice resides on the physical device, and file system identification number 163 indicating the file system to which the slice belongs. Further, in at least one embodiment of the current technique, new metadata, empty slice bit 41, is added to slice map entry 143 which helps determine whether the slice is an empty slice indicating that the slice does not include valid user data.

Figure 10:
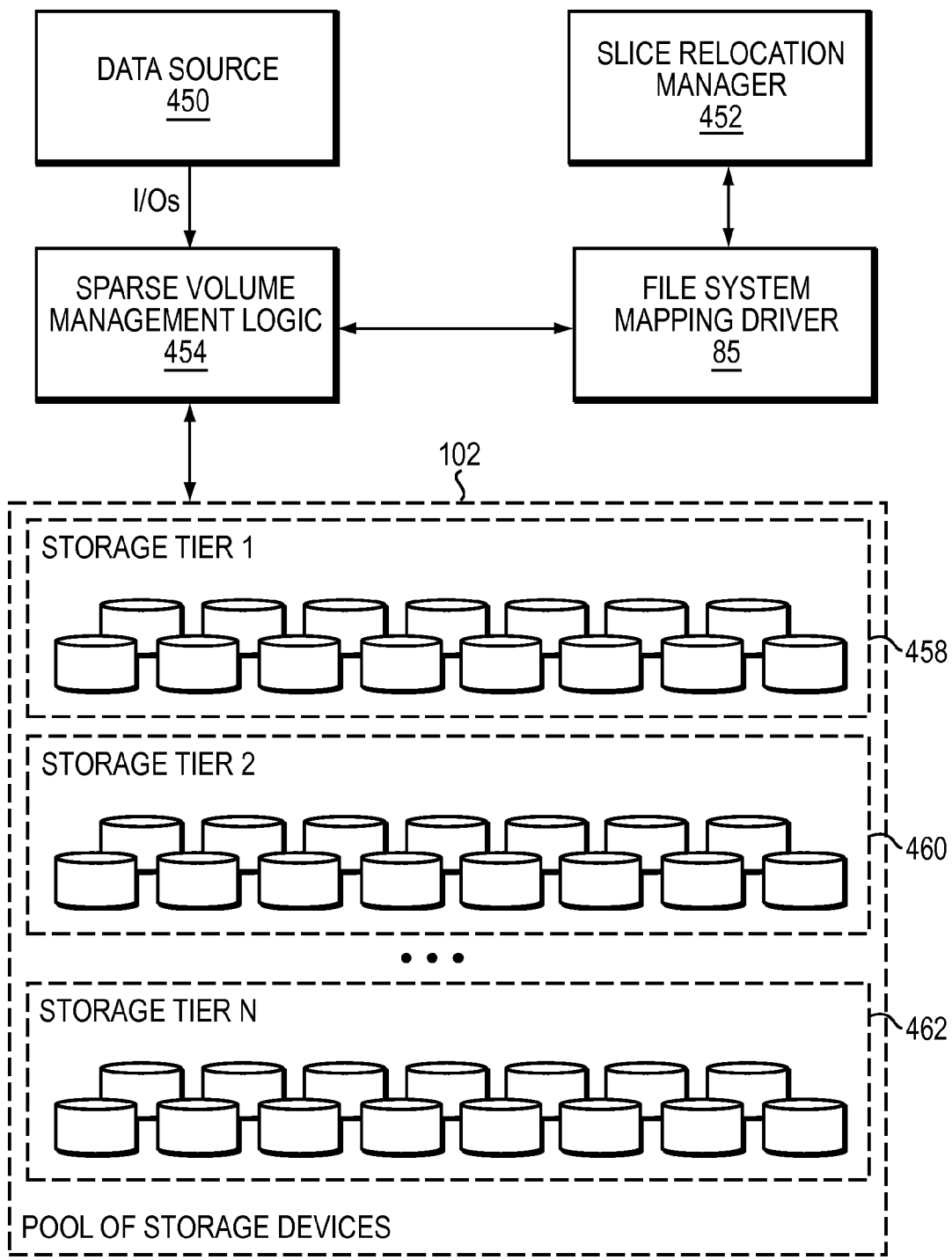

Referring to FIG. 10, shown is a more detailed representation of components that may be included in an embodiment using the techniques described herein. In at least some embodiments of the current technique, a storage pool may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics. Further, storage pool 102 may include one or more storage tiers 458, 460, 462 such that each storage tier has different performance characteristics.

In at least one embodiment of the current technique, slice relocation manager 452 (also referred to as "Auto-Tiering policy engine (PE)") may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Slice relocation manager 452 relocates a slice based on the temperature of the slice. The temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts.

In at least one embodiment of the current technique, slice relocation manager 452 works in conjunction with file system mapping driver 85 to relocate slices. Further, file system mapping driver 85 works in conjunction with sparse volume management logic 454 to relocate slices selected for relocation by slice relocation manager 452. Sparse volume management logic 454 evaluates a slice using metadata information such as an empty slice bit included in a slice map entry for the slice and determines whether the slice is provisioned, unused and unallocated or provisioned and in use. The empty slice bit included in a slice map entry of a slice indicates whether the slice has been written to such that sparse volume management logic 454 may skip copying data for the slice and relocate the slice to a destination slice without having to copy contents of the slice. Thus, in at least one embodiment of the current technique, copying contents of an empty slice which does not include any valid user data is skipped when relocating the empty slice. Sparse volume management logic 454 maintains metadata information such as a bitmap indicating whether a slice is empty. Sparse volume management logic 454 evaluates the bitmap when relocating slices. Further, when data source 450 sends an I/O directed to a slice, sparse volume management logic 454 updates the bitmap (e.g., empty slice bit 164) for the slice indicating that the slice has been written to, is not empty and includes valid user data. Thus, in at least one embodiment of the current technique, slice relocation manager 452 working in conjunction with file system mapping driver 85 sends a list of slices to sparse volume management logic 454 for relocation. Sparse volume management logic 454 evaluates each slice of the list of slices and determines whether each slice is empty and only performs copying of contents of a slice during relocation upon determining that the slice is not empty. Further, in at least one embodiment of the current technique, a user may configure whether to skip copying data of an empty slice. Further, bitmap indicating whether a slice is empty may be maintained both in a memory of a storage system and on a disk such that sparse volume management logic 454 may determine whether a slice is empty form information stored in the memory and flush the information maintained in the memory to the disk at a later time.

Further, in at least one embodiment of the current technique, when a slice is initialized, the empty slice bit for the slice is set to zero in the slice map entry associated with the slice. When a first write I/O request is received for the slice, the empty slice bit for the slice is set to 1 in the slice map entry for the slice. Thus, during relocation of a slice, copying of data of the slice is skipped if the empty slice bit for the slice is set to 0 and in such a case, a destination slice is simply marked as the newly relocated slice without having to copy contents of the slice to the destination slice. Further, when a slice is recovered in case of a failure, the empty slice bit for the slice may be reset.

Figure 11:
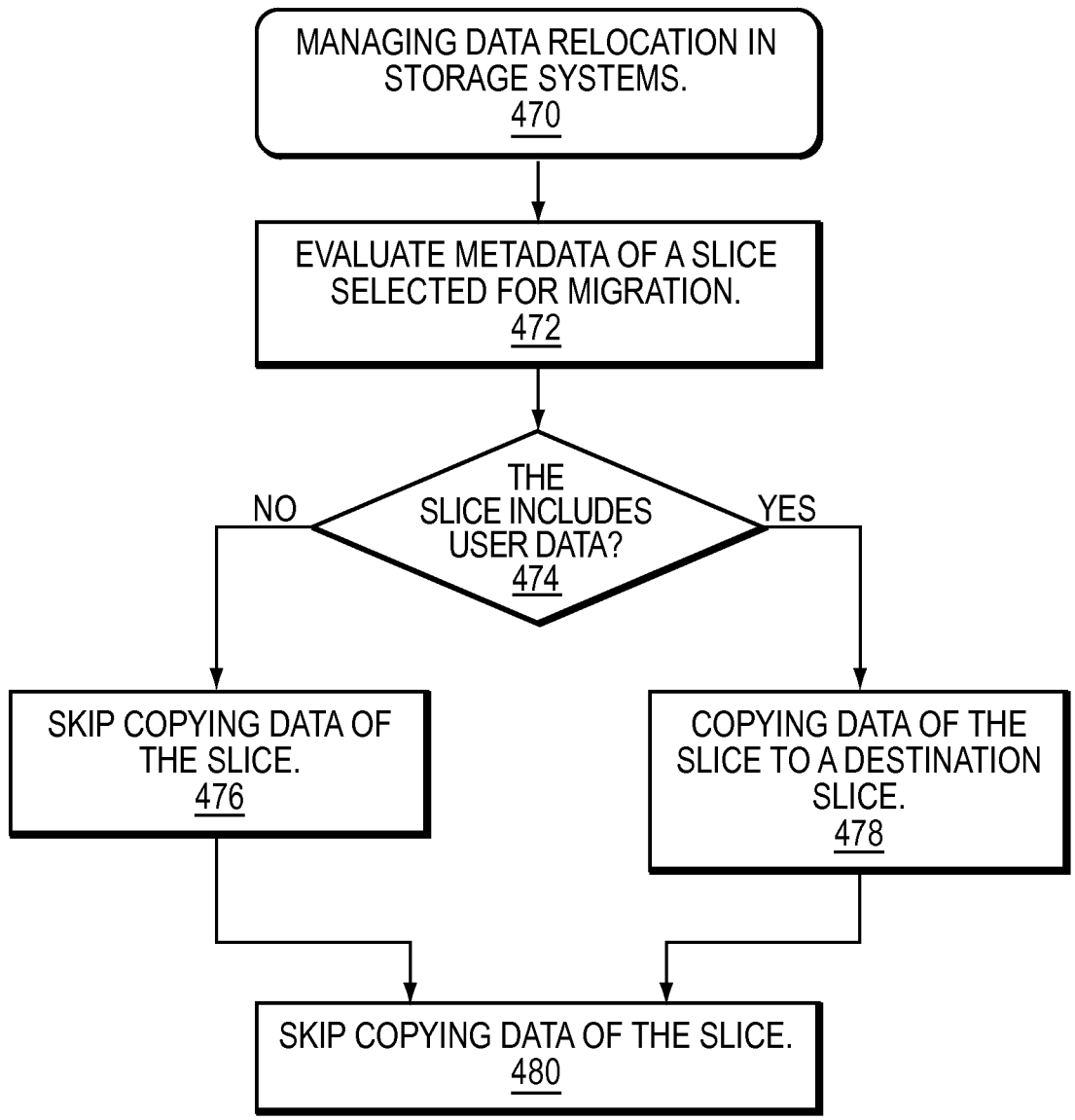
FIG. 11 is a flow diagram illustrating processes that may be used in connection with techniques herein.

Referring to FIG. 11, shown is a more detailed flow diagram illustrating managing data relocation in storage systems. With reference also to FIG. 10, a data storage system manages data relocation of a slice (step 470). Metadata of a slice selected for relocation is evaluated (step 472). Based on the metadata, a determination is made as to whether the slice is empty or includes user data (step 474). Upon determining that the slice is empty, copying data of the slice is skipped during relocation of the slice (step 476). However, upon determining that the slice is not empty but includes user data, the slice is relocated by copying contents of the slice to a destination slice (step 478).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data relocation in storage systems, the method comprising:
    evaluating metadata of each slice of a set of slices of a storage tier in a data storage system for migrating the set of slices from the storage tier to another storage tier, wherein the metadata of each slice of the set of slices is included in a slice map, wherein the slice map includes a set of slice map entries for the set of slices, each slice map entry of the set of slice map entries including the metadata for a respective slice of the set of slices and an empty slice indicator for the respective slice of the set of slices, wherein the empty slice indicator for a slice indicates whether the slice includes user data, wherein the empty slice indicator for a slice is updated to indicate the slice as an empty slice upon provisioning of the slice to a logical volume, wherein the empty slice indicator for an empty slice is subsequently updated upon receiving a first request to write user data to the empty slice, wherein an empty slice indicates a slice that is provisioned to a logical volume and does not include user data, wherein the data storage system includes a first storage tier and a second storage tier configured such that performance characteristics associated with the first storage tier is superior to the second storage tier; and
    based on the evaluation, avoiding copying contents of a slice of the set of slices to a destination slice upon determining that the slice is an empty slice, wherein metadata of the destination slice is updated to indicate that the slice has been migrated to the destination slice without having to copy contents of the slice.

2. The method of claim 1, wherein an auto-tiering policy engine identifies a set of slices for relocation, wherein the slice is a logical representation of a subset of physical disk storage.

3. The method of claim 1, wherein the storage tier and the another storage tier includes a disk drive system comprising a plurality of Redundant Array of Inexpensive Disks (RAID) systems, each RAID system of the plurality of RAID systems having a first disk drive and a second disk drive.

4. The method of claim 1, wherein the empty slice indicator includes an empty slice bit.

5. The method claim 4, further comprising:
    updating the empty slice bit associated with the slice upon receiving a first write I/O request for the slice, wherein the empty slice bit indicates that the slice includes user data.

6. The method claim 4, further comprising:
    updating the empty slice bit associated with the slice upon initialization of the slice, wherein the empty slice bit indicates that the slice does not include user data.

7. The method of claim 1, further comprising:
    determining whether the slice includes user data; and
    based on the determination, relocating the slice without copying contents of the slice to a destination slice.

8. A system for use in managing data relocation in storage systems, the system comprising:
    first logic evaluating metadata of each slice of a set of slices of a storage tier in a data storage system for migrating the set of slices from the storage tier to another storage tier, wherein the metadata of each slice of the set of slices is included in a slice map, wherein the slice map includes a set of slice map entries for the set of slices, each slice map entry of the set of slice map entries including the metadata for a respective slice of the set of slices and an empty slice indicator for the respective slice of the set of slices, wherein the empty slice indicator for a slice indicates whether the slice includes user data, wherein the empty slice indicator for a slice is updated to indicate the slice as an empty slice upon provisioning of the slice to a logical volume, wherein the empty slice indicator for an empty slice is subsequently updated upon receiving a first request to write user data to the empty slice, wherein an empty slice indicates a slice that is provisioned to a logical volume and does not include user data, wherein the data storage system includes a first storage tier and a second storage tier configured such that performance characteristics associated with the first storage tier is superior to the second storage tier; and
    second logic avoiding copying, based on the evaluation, contents of a slice of the set of slices to a destination slice upon determining that the slice is an empty slice, wherein metadata of the destination slice is updated to indicate that the slice has been migrated to the destination slice without having to copy contents of the slice.

9. The system of claim 8, wherein an auto-tiering policy engine identifies a set of slices for relocation, wherein the slice is a logical representation of a subset of physical disk storage.

10. The system of claim 8, wherein the storage tier and the another storage tier includes a disk drive system comprising a plurality of Redundant Array of Inexpensive Disks (RAID) systems, each RAID system of the plurality of RAID systems having a first disk drive and a second disk drive.

11. The system of claim 8, wherein the empty slice indicator includes an empty slice bit.

12. The system claim 11, further comprising:
third logic updating the empty slice bit associated with the slice upon receiving a first write I/O request for the slice, wherein the empty slice bit indicates that the slice includes user data.

13. The system claim 11, further comprising:
third logic updating the empty slice bit associated with the slice upon initialization of the slice, wherein the empty slice bit indicates that the slice does not include user data.

14. The system of claim 8, further comprising:
third logic determining whether the slice includes user data; and
fourth logic relocating, based on the determination, the slice without copying contents of the slice to a destination slice.

* * * * *